(No Model.)
A. HOPKINS
NUT WRENCH.
No. 596,777. Patented Jan. 4, 1898.
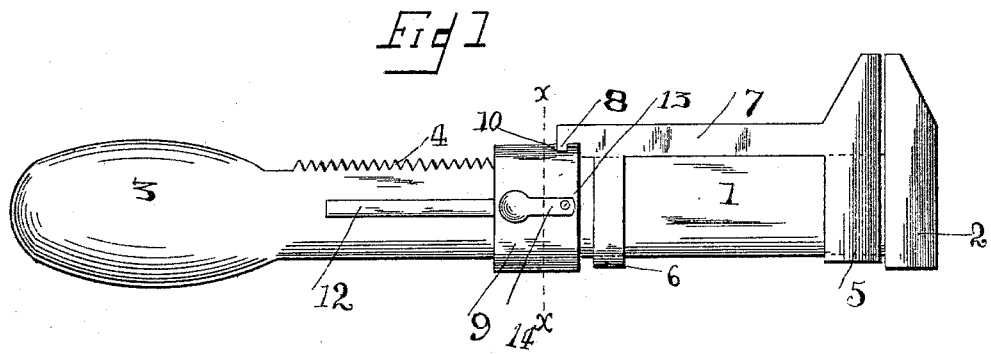
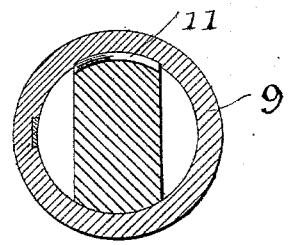
WITNESSES
INVENTOR
Aaron Hopkins.
By John Wedderburn
Attorney

UNITED STATES PATENT OFFICE.

AARON HOPKINS, OF LAKE CITY, IOWA.

NUT-WRENCH.

SPECIFICATION forming part of Letters Patent No. 596,777, dated January 4, 1898.

Application filed March 20, 1897. Serial No. 628,426. (No model.)

*To all whom it may concern:*

Be it known that I, AARON HOPKINS, a citizen of the United States, residing at Lake City, in the county of Calhoun and State of Iowa, have invented certain new and useful Improvements in Nut-Wrenches; and I do hereby declare the following to be a full, clear, and exact description of the invention, such as will enable others skilled in the art to which it appertains to make and use the same.

This invention relates to improvements in sliding-jaw nut-wrenches, the object of the same being to provide an implement of this character which can be quickly adjusted to set the movable jaw. In order to provide a wrench possessing advantages of this style of nut-wrench and yet present an improved construction that will facilitate the adjustment, I have formed the shank of the stationary jaw with teeth on one side and the nut with segmental teeth therein, the shank being flattened to permit the sliding jaw to be slid thereon when the teeth are out of engagement with each other, and combine with such construction a spring-catch for holding the adjusting-nut against movement.

In the following specification I have entered into a detailed description of the particular construction of my invention, reference being had to the accompanying drawings, and to numerals which designate the different parts, and what I consider to be the novel features are specifically set forth in the claims.

In the accompanying drawings, forming part of this specification, Figure 1 is a side elevation of a nut-wrench constructed in accordance with my invention. Fig. 2 is a transverse sectional view on the line $x\,x$ of Fig. 1, and Fig. 3 is a side view of the nut to show the spring-catch thereon.

Referring to the drawings by numerals, 1 designates the shank of the stationary jaw, which is provided at one end with the jaw 2 and is connected at its opposite end to a handle 3 of the ordinary construction to form an easy-grasping portion. The shank 1 is provided on one edge with a series of teeth 4, that are preferably brought to a point, said teeth extending from the handle or thereabout toward the jaw 2 a distance that will provide for the proper adjustment of the movable jaw, hereinafter described.

Upon the shank 1, so as to slide thereon, is mounted the movable jaw 5, having a reinforcing loop or band 6, connected by the portion 7, which extends parallel with the shank and bears against one edge thereof. This connecting portion or bar 7 extends beyond the loop or band 6 and is formed into a hook 8, the edges of which are curved transversely to accommodate the configuration of the part with which it engages. Also mounted upon the shank is a nut or sleeve 9, which is provided near its upper end with a recess 10, extending only partially around its circumference, and this recess is engaged by the hook 8 on the shank or lower part of the movable jaw to hold these parts in sliding engagement with each other. The nut or sleeve 9 is provided interiorly with a series of segmental teeth 11, that are adapted to mesh with the teeth 4 on the forward edge of the shank 1, the last-mentioned teeth being also curved lengthwise or segmental to insure the proper mesh. It will be noted that the shank, being flat, will permit the segmental teeth 11 of the nut or sleeve to be moved out of engagement with said shank by lying to one side of the flattened portion, and when moved to this position the sleeve and movable jaw to which it is connected will be permitted to slide freely on the shank of the stationary jaw, and when the sleeve is turned to permit the teeth thereof to engage the teeth of the shank the movable jaw is set rigidly. In order that the turning of the nut or sleeve may be limited in each direction—that is, to engage and disengage the teeth of the shank—the recess 10, that is engaged by the hook 8, forms shoulders or stops at each end to give this required limit of movement. Now in order to hold the nut or sleeve in positive engagement with the shank of the stationary jaw after the parts have been adjusted the said shank 1 has a longitudinal recess or groove 12, with which engages the pin or point 13 of the spring-catch 14, pivoted upon said nut or sleeve. A spring engages the outer end of the catch to normally force the point in engagement with the groove, and in turning the nut or sleeve out of mesh with the teeth on the stationary shank the spring-catch is first operated. It will be noted that it is only necessary to flatten one side of the shank, and in this case the groove 12 would be located on the adjoining side or back, so that after the catch has been disengaged and the sleeve moved to bring the nut out of engagement with the shank the catch could be released and would automatically engage the groove again by riding upon the rounded portion of the shank. It will also be understood that other changes in the construction of the parts could be made without materially altering the operation, but attaining the same end.

From the foregoing description, in connection with the accompanying drawings, the operation of a wrench constructed as herein shown and described will be readily understood, for it is only necessary in making the adjustment of the movable jaw to first release the catch on the nut or collar and then turn the latter to disengage the shank of the stationary jaw. The movable jaw will then be free to slide, and when the desired nut-opening between the jaws has been obtained the said nut or sleeve is turned to engage the teeth of the shank and is held by the catch. Thus it will be seen that the operation of setting the movable jaw with respect to the stationary jaw can be quickly accomplished, and when set there is no chance of the movable jaw being accidentally displaced or moved.

This nut-wrench has the general appearance of the ordinary sliding-jaw wrench, and the slight changes in construction will not materially add to the cost of manufacture. Therefore I provide a very simple, cheap, and durable implement.

Having thus described my invention, what I claim as new, and desire to secure by Letters Patent, is—

1. In a sliding-jaw nut-wrench, the combination with the shank of the stationary jaw having teeth and a longitudinal groove or recess, a sliding jaw mounted on the shank, a nut or sleeve also mounted upon the shank and connected to the movable jaw to slide thereon and have an independent rotatable movement with respect thereto, and a catch mounted on the nut or sleeve to engage the groove in the shank of the stationary jaw, substantially as shown and for the purpose set forth.

2. In a sliding-jaw nut-wrench, the combination with the shank of the stationary jaw having transverse teeth on its forward edge, flattened on one or more sides, and having a longitudinal recess or groove, of a sleeve in sliding engagement with the shank and provided interiorly with segmental teeth, and a catch carried by the nut or sleeve to engage the groove in the shank, said nut or sleeve having a recess partially surrounding its upper end, together with the movable jaw having a hook or projection which engages the recess in the nut or sleeve, substantially as shown and for the purpose set forth.

In testimony whereof I have signed this specification in the presence of two subscribing witnesses.

AARON HOPKINS.

Witnesses:
A. O. WICK,
S. CRETZLER.